United States Patent

[11] 3,568,786

| [72] | Inventor | Herbert R. Harsch |
| | | 233 Windsor Parkway, Oceanside, N.Y. 11572 |
| [21] | Appl. No. | 784,762 |
| [22] | Filed | Dec. 18, 1968 |
| [45] | Patented | Mar. 9, 1971 |

[54] SNOWMOBILE AND ATTACHMENT THEREFOR
4 Claims, 5 Drawing Figs.

[52] U.S. Cl. ................................................. 180/5, 280/28, 280/28.5
[51] Int. Cl. .................................................B62m 27/02
[50] Field of Search........................................ 180/3, 4, 5, 6, 9.46, 9.24; 280/21, 25, 28, 28.5

[56] References Cited
UNITED STATES PATENTS

| 871,623 | 11/1907 | Phillips | 180/9.46 |
| 1,069,761 | 8/1913 | Buckley | 280/28.5UX |
| 1,176,053 | 3/1916 | Handeland | 180/5 |
| 1,204,799 | 11/1916 | Luce | 180/9.46X |
| 3,101,805 | 8/1963 | Tritle | 180/9.24 |
| 3,477,734 | 11/1969 | Albertson | 180/5X |

*Primary Examiner*—Richard J. Johnson
*Attorney*—Leonard H. King

ABSTRACT: An endless track assembly is coupled to the steering assembly of a snowmobile. The endless track assembly is positioned at the forward end of the snowmobile and replaces the conventional skis. The endless track assembly includes elongated support means that are longitudinally positioned, a plurality of transverse rollers journaled in the support means and an endless belt trained about the rollers such that a portion of the belt is in engagement with the ground.

PATENTED MAR 9 1971   3,568,786

INVENTOR.
HERBERT R. HARSCH
BY
Leonard H. King
ATTORNEY.

SNOWMOBILE AND ATTACHMENT THEREFOR ski-type

This invention relates generally to snowmobiles or the like and more particularly to a ground engaging attachment for the steering assembly thereof.

BACKGROUND OF THE INVENTION

Power driven vehicles, commonly called snowmobiles, snowbikes, etc. are becoming increasingly popular for travelling over snow covered terrain. These prior art vehicles, which will hereinafter be referred to by the generic term snowmobile, are basically comprised of a suitable chassis or frame that also includes appropriate seating means, drive means which is usually in the form of an internal combustion engine, an endless ground engaging track assembly conventionally coupled to the drive means for propulsion purposes and a steering assembly that includes spring biased ski means.

While prior art snowmobiles are well adapted for travel over snow covered terrain, considerable difficulties are encountered when the same vehicle is used on ground without a snow cover or where, and at such times as the snow has substantially melted. However, the utility of a snowmobile is severely reduced under the adverse conditions noted above because of the presence of the ski-equipped steering means. At best the snowmobile is difficult to transport in the absence of snow so that an auxiliary vehicle must be used for this purpose. It is apparent then that the use of skis, as in the prior art steering assemblies of snowmobiles, represents a serious shortcoming and limits the utility of the vehicle to snow covered ground.

By way of contrast, the present invention permits a snowmobile to be driven over almost any type of terrain even in the absence of snow. In its broadest aspect the present invention comprises a second endless ground engaging track assembly that is used instead of the steering skis of the prior art. The second endless track assembly of the invention is not motor driven but of course is steerable by means of the movement of the steering assembly. Preferably the spring biasing means used with the prior art ski-type steering assembly is used with the instant invention. One embodiment of this invention, which will be described in greater detail hereinafter, comprises a channel member and a plurality of roller means journaled in the channel. The second endless track or belt is trained about the rollers such that a portion of the second track engages the ground. Means are also provided for coupling the channel member to the steering assembly and for adjusting the tension of the belt. While two endless parallel oriented second track assemblies will be described and illustrated as the preferred embodiment, it should be understood that the present invention also contemplates the use of a single, centrally located second track assembly at the front of the snowmobile to define a tritrack arrangement in combination with two aft located driving track assemblies.

Accordingly, it is a primary object of this invention to provide an improved snowmobile.

Another important object of this invention is to provide an improved snowmobile having an endless track steering assembly in addition to motor powered driving track assemblies.

An additional object of this invention is to provide an improved steering attachment for a snowmobile.

A particular object of this invention is to provide a second endless track assembly as a steering attachment for a snowmobile.

A feature of the present invention, as described above, is that it may readily be attached to conventional snowmobiles in place of the existing ski-type steering assembly.

An advantage of the present invention, as described above is that it permits usage of the snowmobile over terrains with little or no snow.

These and other objects, features and advantages of the invention will, in part, be pointed out with particularity and will, in part, become obvious from the more detailed description of the invention taken in conjunction with the accompanying drawing which forms an integral part thereof.

DESCRIPTION OF THE DRAWING

In the various figures of the drawing like reference characters designate like parts.

Figure 1:
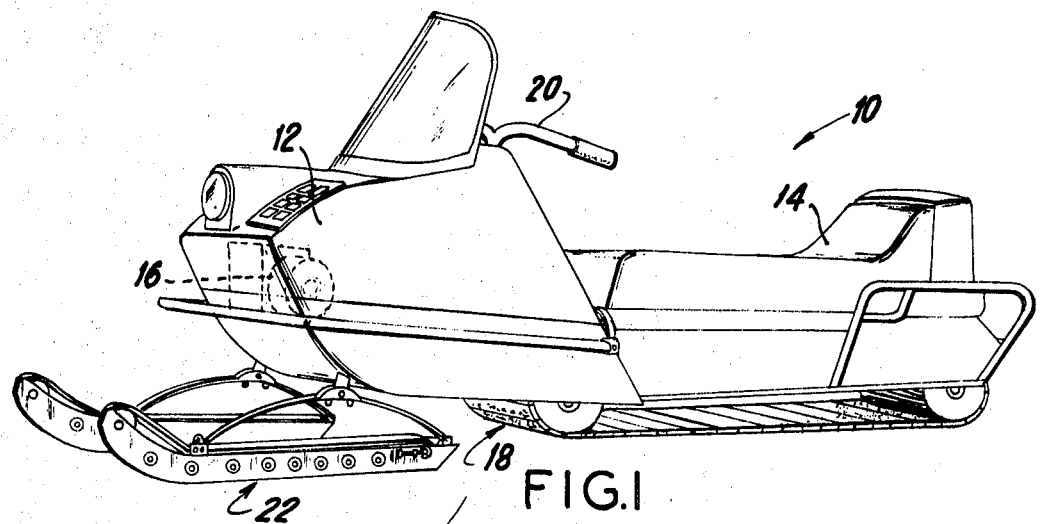
FIG 1 is a perspective view illustrating the present invention in combination with a snowmobile.
Figure 2:
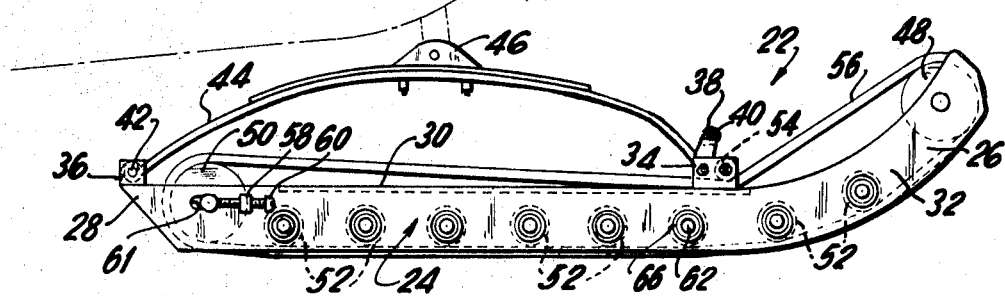
FIG. 2 is an enlarged side elevational view of the endless steering track comprising the present invention.
Figure 3:
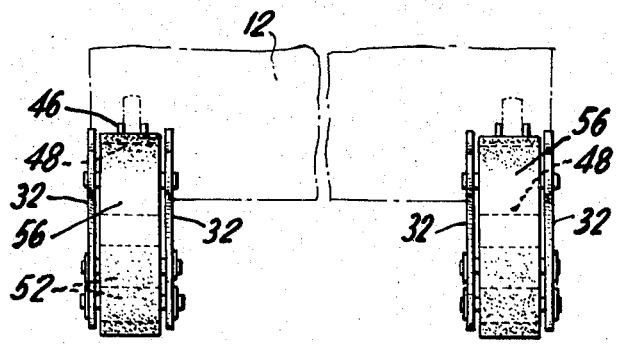
FIG. 3 is a front elevational view of the structure shown in FIG. 20.

Referring now to the drawing, and in particular to FIGS. 1—3, there is shown a snowmobile 10 incorporating the present invention. The snowmobile 10 includes, as conventional elements, a chassis and body portion 12 on which seating means 14 are provided, a motor 16 connected conventionally by means of any suitable coupling means such as a sprocket and chain arrangement to a first pair of spaced, aft positioned endless drive tracks 18. Conventional throttle, brake, clutch, fuel, carburetion and ignition systems are included although they are not illustrated. Steering means 20 extends through the body portion 12 and terminates beneath the lower surface thereof at a second or forward endless track means generally designated by the reference character 22.

With particular reference to FIG. 2 and FIG. 3, it will be seen that the second endless track means 22 is supported in a pair of inverted, substantially U-shaped channels 24 made of iron, steel or any suitable alloy, and appropriately plated, as required, The forward end 26 of each channel 24 is curved upwardly. Further, at both the rearward end 28 as well as the forward end 26 the web portion 30 of each channel 24 is removed to define longitudinally extending, parallel sidewalls 32.

Each channel 24 has a pair of forward brackets 34 and a pair of rearward brackets 36 suitably secured to the top surface thereof, for example by welding. A pair of links 38 are mounted on the forward brackets 34 and a transverse pin 40 is positioned between the links 38. At the rearward end of each channel 24, a transverse pin 42 is positioned between the brackets 36. Pins 40 and 42 provide means for mounting the forward and rearward ends, respectively, of a pair of leaf springs 44 which are, in turn, mounted on the underside of the body portion 12 and to the steering assembly 20 by brackets 46. It will be appreciated that by using the leaf springs that are conventional with substantially all prior art snowmobiles, the track assembly comprising the present invention can, with a minimum of time and expense, replace the skis that were used heretofore.

As shown in the drawing, a plurality of roller means are journaled or rotatably mounted on each channel member 24. Using a 4-inch by 4-inch by ⅛-inch thick channel member 24 there are provided 3-inch diameter forward and rearward roller means 48 and 50, respectively. A plurality of smaller rollers 52, eight in number in the embodiment illustrated, are also mounted on each channel member 24 intermediate the rollers 48 and 50 and still another relatively small diameter roller 54 is mounted transversely between each pair of forward brackets 34. Finally, an endless belt 56 is trained about the rollers 48, 50 and 52 and underneath the roller 54. Preferably, the rollers are suitably plated steel and the belt 56 is 4 ply, ⅜-inch thick nylon reinforced rubber. By properly locating the axes of the roller means 48 and 50, a portion of the belt thickness will extend below the lowermost edge of the sidewalls 32 to place the face of the belt 56 in engagement with the ground surface.

In order to maintain the belts 56 in a taut condition tensioning means are provided. Pivotal roller assemblies may be used but for purposes of economy, maintenance and ease of adjustment the structure shown at the left side of FIG. 2 is preferred. In the embodiment illustrated a bracket 58 is welded or otherwise secured to the outer surface of each sidewall 32 and a screw 60 is threaded therein. An end of each screw 60 bears against a portion of rearward roller means 50 which is mounted either in an elongated slot 61 or an oversized hole that permits limited movement of the roller means 50 in a rearward direction when the screws 60 are advanced. Since the belt 56 is trained about the roller means 50, advancing the screw 60 towards the rear will place the belt 56 under greater tension.

Figure 4:
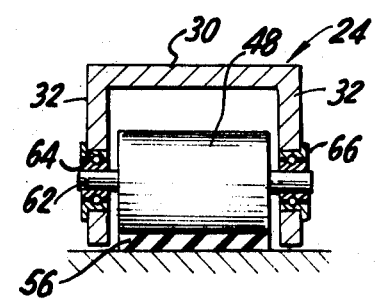
FIG. 4 is an enlarged transverse sectional view taken through a typical roller shown in FIG. 2.

Several methods of journaling or rotatably mounting the roller means on the channel member 24 are contemplated in order to minimize frictional forces. One embodiment is shown in FIG. 4 using forward roller 48 by way of example. It should be understood, however, that any or all of the rollers may be mounted in a similar manner. The roller 48 is provided with reduced diameter end portions 62 that are positioned in oversized holes 64 formed in the sidewalls 32 of each channel member 24. Roller bearing 66 is then press fit on the reduced diameter portions 62 and in coaxial oversized holes 64 so that the roller member 48 may rotate freely with a minimum of friction. Means well known to those skilled in the art may be used to both lubricate and seal the roller bearing 66.

Figure 5:
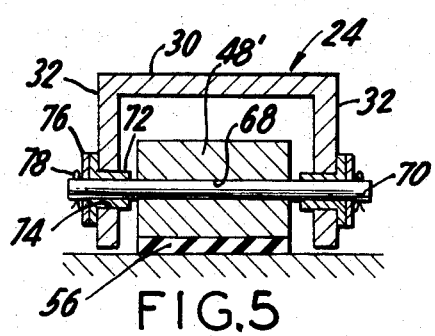
FIG. 5 is a view similar to FIG. 4 but illustrating an alternative construction.

An alternative arrangement for mounting the rollers is illustrated in FIG. 5. In this instance roller 48' is provided with an elongated, longitudinal bore 68 and an axle 70 is placed therein. Sleeve bearings 72 are press fit into suitably sized coaxial apertures 74 formed in the sidewalls 32 of the channel members 24 to receive the outboard ends of the axle 70. Washers 76 and cotter pins 78 may be used to prevent longitudinal movement of the axle 70. Preferably the sleeve bearings 72 are of the permanently lubricated type that is well known and readily available. It should also be noted that, if desired, the washers 76 and cotter pins 78 may be eliminated by using setscrews or pins to make the roller 48' and the axle 70 a unitary structure but of course this would have to be done after the axle 70 has been assembled in the sleeve bearings 72.

From the foregoing it will be appreciated that improved means have been provided for supporting the front end of a snowmobile. The structure described above and illustrated may readily be attached to existing snowmobiles or may be provided as original equipment. In either case, the snowmobile has substantially greater utility since its movement is not limited to snow-covered terrain. With the present invention the snowmobile can be used on sand, on grass, or in the brush. Further, a snowmobile using the present invention in place of the conventional skis can move from one type of terrain, for example, grass, to adjacent terrain that may be snow-covered. This is readily accomplished without auxiliary equipment and without making any structural changes.

For the purpose of clarity, the belt is shown narrower than the channel. However, in actual practice the belt is substantially the width of the inside of the channel to keep the belt trained.

There has been disclosed heretofore the best embodiment of the invention presently contemplated. However, it is to be understood that various changes and modifications may be made by those skilled in the art without departing from the spirit of the invention.

I claim:

1. An improved snowmobile or the like comprising the combination of:
   a. a chassis;
   b. drive means mounted on said chassis;
   c. rearwardly positioned endless drive track means coupled to said drive means:
   d. a steering assembly mounted on said chassis;
   e. at least one forwardly positioned, ground engaging track assembly coupled to said steering assembly and comprised of an elongated, longitudinally positioned ski-shaped support member, having an upwardly curved front portion and horizontal central portion. horizontal central portion. A polarity of transverse roller means journaled in said support member along support member along the length thereof, said forwardmost and rearwardmost rollers being larger than said rollers therebetween and endless belt means trained about said rollers such that the belt follows substantially the upper and lower surfaces of said support member and a portion of said belt means is in engagement with the ground said endless belt being free to move about the rollers in response to movement over the terrain.

2. The snowmobile in accordance with claim 1 wherein there are a pair of said forwardly positioned, ground engaging track assemblies arranged in side-by-side relationship, both of which are coupled to said steering assembly.

3. The snowmobile in accordance with 1 wherein said belt means is rubber.

4. The snowmobile in accordance with claim 1 wherein there is further included spring biasing means intermediate said steering assembly and said forwardly positioned ground engaging track assembly.